(No Model.)  2 Sheets—Sheet 1.

W. H. STEWART.
CHECK ROW ATTACHMENT FOR CORN PLANTERS.

No. 330,523.  Patented Nov. 17, 1885.

WITNESSES  
T. Walter Fowler  
H. B. Applewhaite

INVENTOR  
Wm. H. Stewart  
per A. H. Evans & Co.  
Attorneys (No Model.) 2 Sheets—Sheet 2.

W. H. STEWART.

CHECK ROW ATTACHMENT FOR CORN PLANTERS.

No. 330,523. Patented Nov. 17, 1885.

WITNESSES
T. Walter Fowler
H. B. Applewhaite

INVENTOR
Wm H. Stewart
per A. H. Evans & Co.
Attorneys

UNITED STATES PATENT OFFICE.

WILLIAM H. STEWART, OF BOONVILLE, MISSOURI, ASSIGNOR TO CHARLES J. BURGER, OF SAME PLACE.

CHECK-ROW ATTACHMENT FOR CORN-PLANTERS.

SPECIFICATION forming part of Letters Patent No. 330,523, dated November 17, 1885.

Application filed April 9, 1885. Serial No. 161,658. (No model.)

*To all whom it may concern:*

Be it known that I, WILLIAM H. STEWART, a citizen of the United States, residing at Boonville, in the county of Cooper and State of Missouri, have invented certain new and useful Improvements in Check-Row Attachments for Corn-Planters, of which the following is a full, clear, and exact description, reference being had to the accompanying drawings, forming part of this specification, in which—

Figure 1:
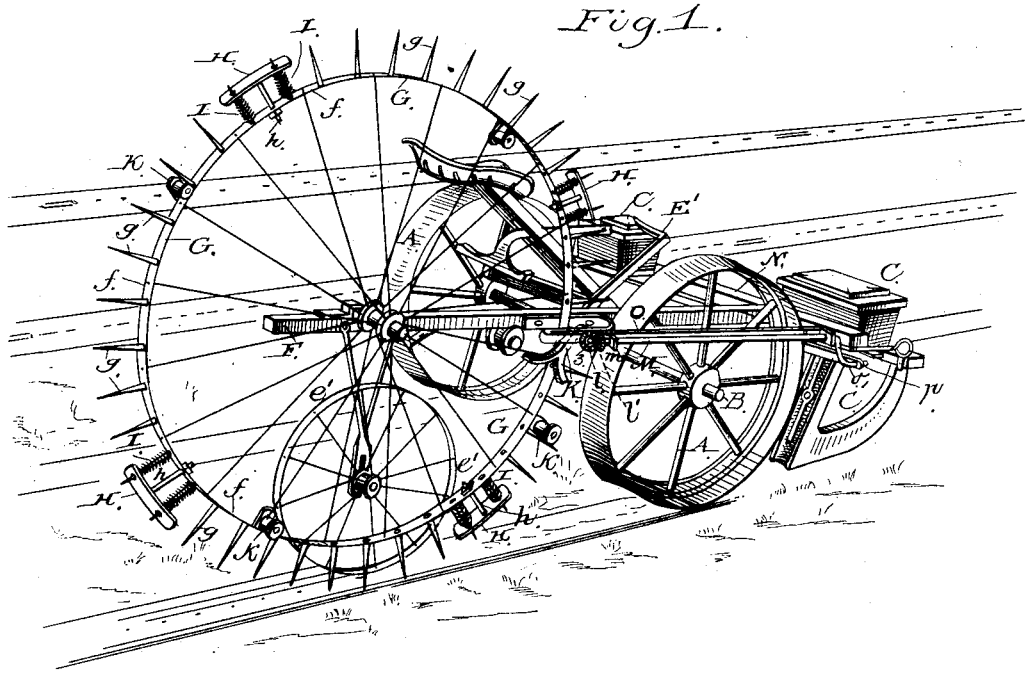

Figure 1 represents a perspective view of a corn-planter embodying my improvements. Figs. 2 to 5, inclusive, are details of construction, to be hereinafter fully described.

My invention relates to check-row attachments for corn or other planters. It is an improvement on Letters Patent No. 309,004, granted to me December 9, 1884; and it consists in the combination of devices hereinafter described and claimed.

To enable others skilled in the art to make and use my invention, I will now proceed to describe the exact manner in which I have carried it out.

In the said drawings, A represents the wheels, B the axle, and C the seed-boxes, of an ordinary corn-planter, which is also provided with the runners or shoes C', while the planter has the usual frames and cross-timbers, as shown in Fig. 1.

Figure 2:
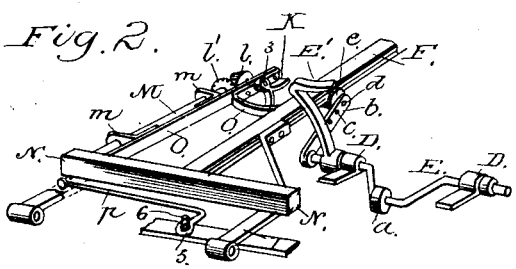
Figure 3:
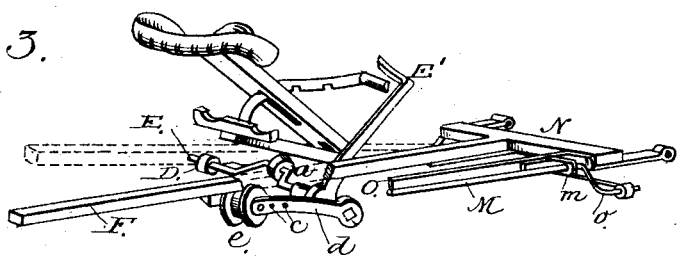
Figure 4:
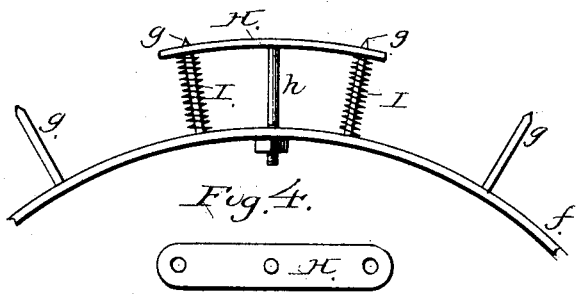

D, Fig. 2, are journal-bearings secured by bolts or otherwise to the side timbers, and preferably behind and beneath the seat of corn-planters now in use. Extending through these bearings and transverse to the planter is loosely fixed the crank-shaft E, being bent, as seen, about midway its length, and so constructed as to form a forwardly-extending crank or lever. Upon the crank or lever is loosely fixed a friction-roller, $a$, which is placed so as to come under and near the fulcrum of the foot-lever that is used upon all corn-planters for the purpose of lifting the runners out of the ground when so desired. At one end of shaft E, and nearest to the checking device, is firmly fixed the foot-lever E', arranged so as to accommodate itself to the foot of the driver. To the extreme end of shaft E is firmly secured the crank $b$, which in turn extends backward and upward, and terminates at or near the timber F of the checking device. The crank or lever $b$, it will be observed, has several perforations, $c$, the object of which is to adjust and firmly hold by a threaded nut the pin $d$, upon which is loosely secured the flanged friction-roller $e$, as shown in Fig. 3.

G represents a large wheel mounted in a supplemental frame, and adapted to travel in the path made by the supporting-wheels. This wheel consists, essentially, of an outer flange, $f$, having projecting from its periphery a series of spikes or pointed projections, $g$, which, coming in contact with the ground, assist the rotation of the wheel.

H represents plates of metal, perforated to receive the ends of the spikes $g$, and provided with guide-rods $h$, which pass through perforations in the outer flange, so as to have a sliding movement therein. A coiled spring, I, is slipped over the end of any one or more of the outward-extending spikes of the large wheel, and the plate H is placed over the coiled spring, so that the said spikes pass loosely through the openings made for the purpose in plate H. The rod $h$ is firmly attached to bar H, and passes loosely through the rim and receives a threaded nut from the inside of the rim, and thus permitting the plates H to move toward and from the rim as the coiled springs are compressed by the contact of the plates with the ground. Secured to the opposite sides of the outer flange of the wheel are the small rollers $k$, adapted to alternately operate a cam, K, pivotally secured to the bar O, the shaft 3, on which the cam is secured, carrying on its opposite end a bevel gear-wheel, $l$, which meshes with a like gear, $l'$, and, operating a rod, M, imparts a reciprocating motion to the seed-slide, as I will hereinafter describe.

As in my former patent, bar F in the present case represents a timber passing over the main frame or body of the planter, but this time terminating and mortised and tenoned into the cross-timber N. This timber is placed so as to pass between the hopper or feed-box and the main wheels of corn-planters now in use, and may be ironed after the manner and similar to a pair of ordinary carriage-shafts, so as to be loosely hinged or pivoted to the front timber that passes under the hoppers and runs parallel to the shifting-bar of all corn-planters. Firmly secured to the bar F and to one side of the planter is the iron bar O, which, after being bent at right angles, passes backward and to the outside of the traveling wheel of the planter, and after passing a portion of the wheel G of the checking device the bar O is bent so as to lap back on itself, and after being firmly attached to the lapped portion it is again bent at nearly right angles, passing through and between the check-row wheel and the wheel of the corn-planter, and is firmly secured to the bar, as shown in Figs. 1 and 2. To the bar O is also securely attached the clips or bearings m, which are bent at right angles and perforated for the purpose of loosely receiving the rod M, the purpose of rod M being hereinafter more fully explained. To the end of rod M, and nearest the planter, is attached a crank, o'; or, if desired, the rod may be bent at approximately two right angles, as shown. The rod M is passed through the bearings m, and is firmly fixed to the bevel-toothed wheel l'. The bevel gear-wheel l is firmly keyed on the shaft 3, which loosely passes through the lapped portion of bar O, and this shaft 3 has firmly fixed to it, by a key or otherwise, the cam K, as in my former patent, except it will be observed the cam is placed on the opposite side of the wheel, the importance of this change being hereinafter explained. To the crank end of shaft M is loosely fixed the rod p, which is preferably made of spring-steel, and, passing to one side, is bent at right angles and terminates in a link, 5, which engages a pin, 6, (shown in Fig. 2,) its construction and purpose being easily understood.

Figure 5:
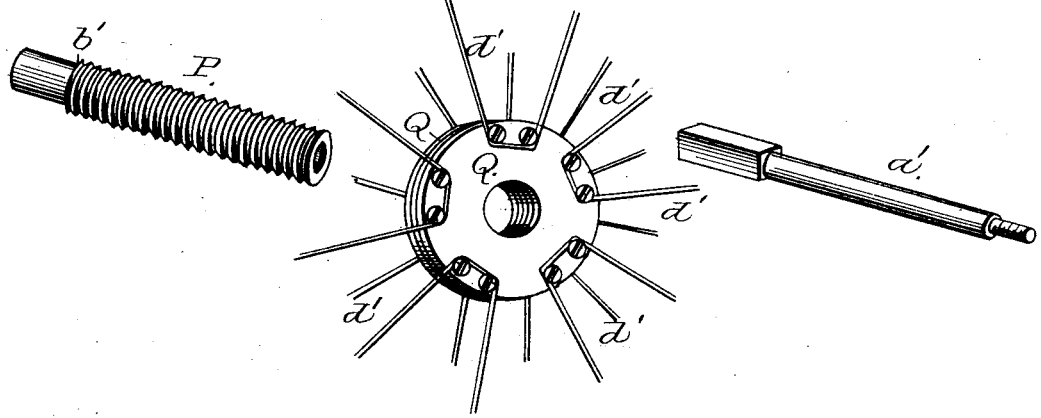

In Fig. 5 I have illustrated in detail the construction of the hub of wheel G, and by employing such construction I am enabled to secure a wheel which is very strong, and one that is necessarily very light. By referring to this figure it will be seen a pin, a', is adapted to enter and loosely fit a thimble, P, which is threaded a portion of its length, but is provided with a smooth cylindrical surface, provided with a shoulder, b'. This smooth portion enters an opening in the hub proper, which consists of two or more plates, Q, bolted together, as shown, and in such manner that the wheel is permitted to revolve without interfering with these parts, except to increase the tension of the spokes, as I shall hereinafter explain. The wire spokes d' pass around suitable pins or equivalent devices, by means of which they are secured, and then project outwardly and pass through the perforations in the outer flange, to which they are securely riveted on the outside. After the thimble P has been properly inserted the wheel is made to revolve around the thimble, which, as before stated, is threaded, thereby causing the hub to travel outward on the thimble until the tension of spokes is regulated to any degree desired.

From the foregoing description it is manifest that if the crank-shaft E be placed in position as seen, and the driver takes his seat upon the planter and starts for the field, he would first place his feet upon the foot-lever, and by pressing it downward would lift the runners out of the ground, when, by a pawl-and-ratchet device—such as belong to all planters—the foot-lever becomes locked in its position. This being done, if the crank-shaft be placed in position as seen, then the foot-lever in descending would come into contact with the friction-roller a, and the shaft E, being free to move in its bearings, it would permit the friction-roller a to descend, and so be held until the foot-lever of the planter was released from its locked position. If the friction-roller be moved downward, then the flanged friction-roller, because of arm b, would be thrown upward and forward, thereby lifting the bar F upward to the dotted line. (See Fig. 3.) By this arrangement the driver can never lift the runners from the ground unless the check-row device is also lifted free from the ground, and as the driver cannot well turn without lifting the runners, then there is no possibility of the check-row device being interfered with in its movements. Again, it is evident that if at any time the driver places his foot upon the lever E' he will by pressing it forward compel shaft E to make a partial revolution, and the friction-roller a will descend independent of the foot-lever of the corn-planter, when the flanged friction-roller will lift bar F, and the checking device or wheel G can by the hand of the driver be adjusted backward or forward, so as to harmonize with the rows or hills of corn already planted. By removing his foot the wheel G and bar F will of their own weight descend and bring the shaft E back to its normal position. When this is done, the friction-roller a will still have a surplus of room left before coming directly in contact with the foot-lever of the corn-planter, and this will permit the flanged friction-roller to oscillate up or down, because of a slight unevenness of ground over which the wheel travels.

By reference to my former patent, No. 309,004, it will be seen the lever is independent of the movement of the runners of the planter, and that after driving to the end of the row if the driver should forget to operate the lever the check-row device would, because of turning, become strained or broken, as he cannot turn without lifting the runners from the ground. By the use of my present device the mere act of lifting the runners causes the lifting of the check-row. Thus the advantages of my present device are made manifest. Again, if the cam K be placed and held in position upon the opposite side of wheel G, and said cam be moved back and forth in a swinging position, by reason of its different sides coming alternately into contact with the rollers on the wheel, then must the toothed wheels l l' take up a corresponding backward and forward motion around their center, and as shaft is free to act it must also cause the crank to vibrate from side to side in a swinging position and operate the seed-slide.

Having thus described my invention, what I claim as new, and desire to secure by Letters Patent, is—

1. The combination, with a planter, a frame, and clips whereby the frame is pivotally secured to the frame of the planter, of a crank-shaft, suitable clips in which the shaft is journaled, a foot-lever upon the shaft, an arm, b, and the rollers a and e, substantially as herein described.

2. The combination, with a frame hinged to the frame of the planter, of a crank-shaft, a roller, a, an arm, b, provided with a series of perforations, and a flanged roller adapted to be adjusted upon said arm, substantially as and for the purpose specified.

3. In a planter, the combination, with a beam, F, of a wheel mounted upon said beam, and adapted to travel in a path made by the supporting-wheels, said wheel having a flange with a series of spikes projecting therefrom, and a series of perforations adapted to receive the shanks of yielding plates, substantially as and for the purpose set forth.

4. The combination, with a planter, of a wheel, G, having a flange, f, spikes projecting from the flange, suitable rollers on said flange, and a cam by the movements of which and suitable gearing the seed-slide is operated, substantially as herein described.

5. The wheel G, provided with a flange, f, and spikes projecting therefrom, in combination with perforated plates H, provided with shanks h, passing through perforations in the flange, nuts for securing the shanks, and springs I, interposed between the plates and flange, substantially as herein described.

6. The combination, with the swinging frame and a wheel provided with rollers, of a bent bar, O, a cam mounted in the bar, bevel-gears l l', and a rod provided with a crank for operating the seed-slide, substantially as herein described.

WILLIAM H. STEWART.

Witnesses:
ED H. REDMAN,
MARTIN HALLER.